Feb. 19, 1952 — E. LANDIS — 2,586,671
LUBRICATING SYSTEMS
Filed Oct. 19, 1945 — 2 SHEETS—SHEET 2
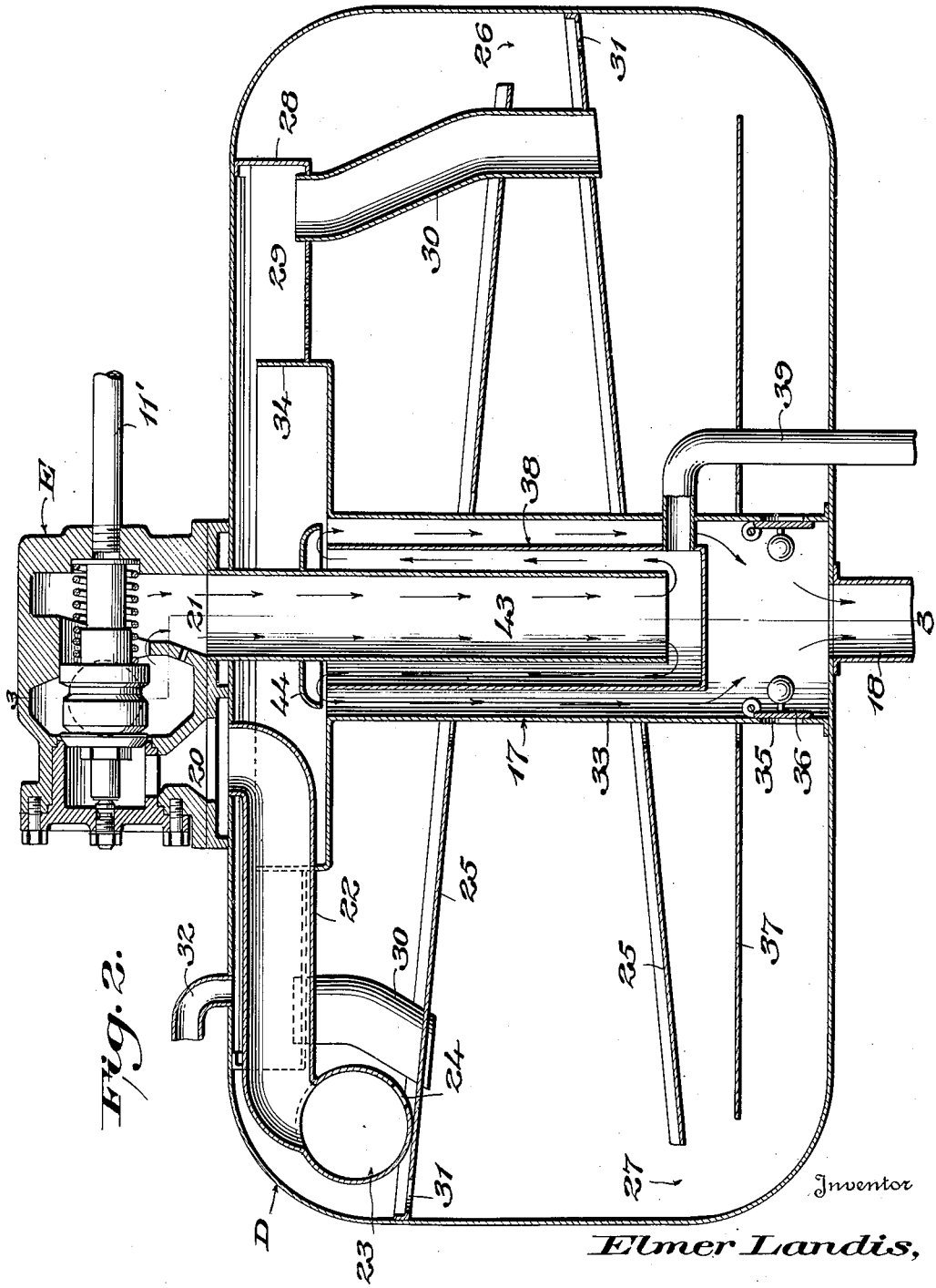
Inventor
Elmer Landis,
By J. E. Beringer
Attorney Patented Feb. 19, 1952

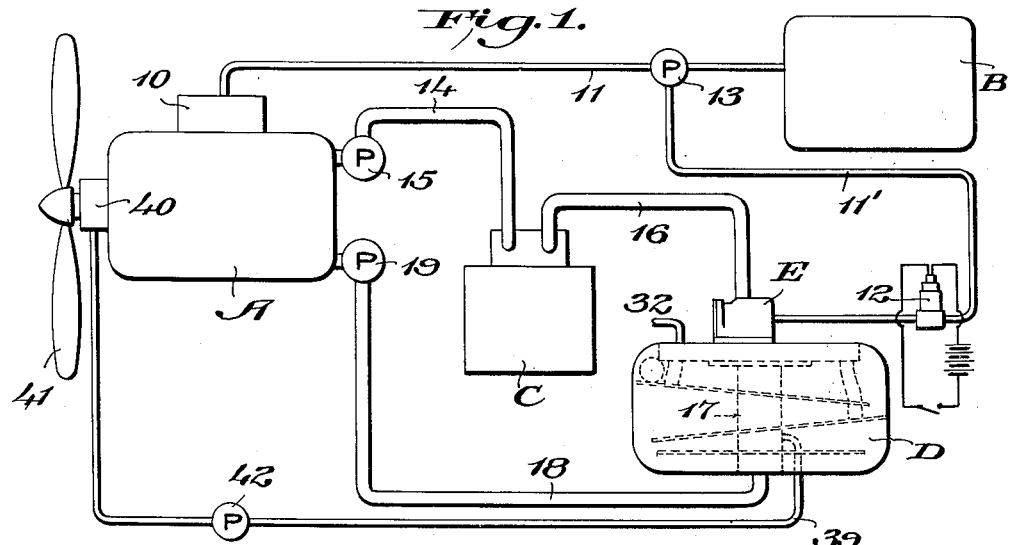
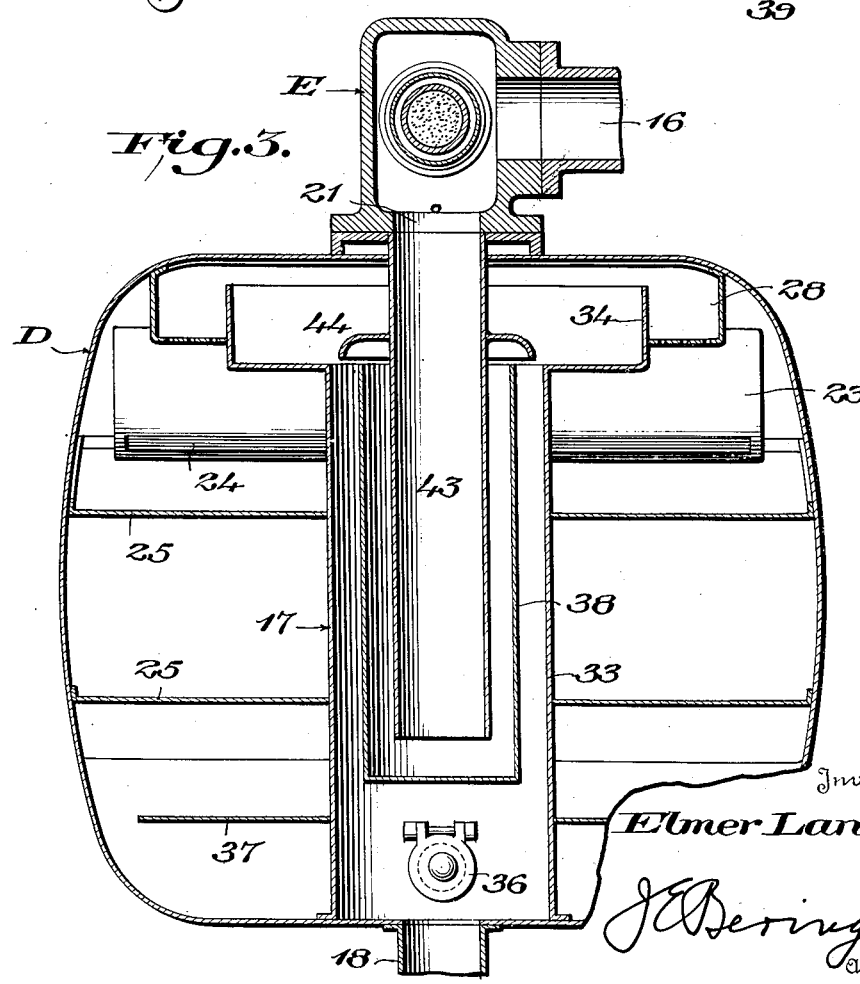

2,586,671

UNITED STATES PATENT OFFICE 2,586,671

LUBRICATING SYSTEMS

Elmer Landis, Clayton, Ohio, assignor to United Aircraft Products, Inc., Dayton, Ohio, a corporation of Ohio Application October 19, 1945, Serial No. 623,252

3 Claims. (Cl. 137—21)

This invention relates to lubricating systems for aircraft and other engines, and has particular reference to improvements in oil tanks such as are used in such systems.

Most oils such as are used for the lubrication of aircraft and other engines will congeal at low temperatures and, if permitted to congeal during periods of engine idleness, may render subsequent engine starting very difficult and even impossible. It is therefore known practice to dilute engine lubricating oil with gasoline or the like to facilitate engine starting following periods of engine idleness when the atmospheric temperature is so low as to congeal the oil if it is undiluted. Since, however, dilution of the oil detracts from its lubricating efficiency, it is further known practice to dilute only part of the oil for engine starting purposes. In this connection, one primary purpose of an oil tank of the type used in engine lubricating systems is to separate a minor, diluted portion of the oil from the main body thereof. Further in this connection, it may be desirable to utilize the diluted oil for other than engine starting purposes as, for example, to operate various different aircraft control elements. It is therefore further known practice to provide the oil tanks of engine lubricating systems with reservoirs for the diluted oil to afford a supply of such oil for desired purposes, particularly at times when the main body of the oil may be congealed. The present invention is concerned particularly with such reservoirs and has for its general object to provide a simple, practical reservoir embodying a construction and particularly an advantageous compact arrangement within an oil tank to insure an adequate supply of the diluted oil at any given time for any desired purpose.

With the foregoing and other objects in view, which will become more fully apparent as the nature of the invention is better understood, the same consists in a diluted oil reservoir for oil tanks embodying the novel features of construction and the novel features of combination with and arrangement within an oil tank, as will be hereinafter more fully described, illustrated in the accompanying drawings and defined in the appended claims.

In the accompanying drawings, wherein like characters of reference denote corresponding parts in the different views:

Fig. 1 is a diagrammatic view of an engine fuel supply and lubricating system embodying an oil tank in accordance with the invention.

Fig. 2 is an enlarged, vertical, longitudinal section through the oil tank; and

Fig. 3 is a vertical, transverse section on the line 3—3 of Fig. 2.

Referring to the drawings in detail, first with particular reference to Fig. 1, A designates, generally, an engine such as an aircraft engine; B designates a tank to contain gasoline or other liquid fuel for operating the engine A; C designates an oil cooler interposed in the lubricating system of the engine A; D designates, generally, an oil tank also interposed in the engine lubricating system and with which the present invention particularly is concerned, and E designates, generally, a valve controlling flow of oil to the tank D and admission of a diluent, such as gasoline, to the oil.

The fuel tank B is connected to the carburetor 10 of the engine A by a fuel supply pipe 11. It also is connected with the valve E by a branch 11' of the pipe 11. In the branch 11' is a suitable valve 12 which may be electrically or otherwise operable at will, whereby any desired amount of fuel may be supplied at any desired time from the fuel tank B to the valve E for oil dilution purposes. As usual, a pump 13 is interposed in the pipe 11 for forcing fuel from the fuel tank B to the engine A and to the valve E.

From the engine A a lubricating oil return pipe 14 leads to and is connected with the inlet of the oil cooler C, and in this pipe may be interposed a pump 15 for effecting positive return flow of oil from the engine to said cooler. From the outlet of the cooler C a pipe 16 leads to and is connected with the inlet of the valve E. In the oil tank D is means, designated generally as 17, defining a path for flow of oil through said tank in by-passing relationship to oil contained in said tank proper. The bottom of this flow-path defining means is connected with the engine A by a pipe 18 in which may be interposed a pump 19 for effecting positive return flow of oil from the tank D to the engine A.

The valve E has two outlets, 20 and 21, the first of which is connected by a pipe 22 with a manifold 23 disposed within the tank D adjacent to its top and near one end thereof, and the second of which is connected with the top of the by-pass flow path defining means 17.

The valve E is of a thermally operable type, operable by the temperature of the oil flowing therethrough and by the temperature of the gasoline or other oil diluent supplied therethrough to the oil, to direct the oil either to the manifold 23 or to the by-pass flow path defining means 17. No novelty is claimed respecting said valve per se and the same therefore has not been illustrated in detail, particularly as the same is well known. Suffice it to say that if the oil is at or above a predetermined temperature it is directed to the manifold 23, and if it is below said predetermined temperature it is directed to the by-pass flow-path 17.

The manifold 23 extends transversely of the tank D substantially from side to side thereof and has an oil outlet opening in the form of a long, narrow slot 24 which extends lonigtudinally thereof either from end to end thereof or, in any event, throughout a considerable portion of the width of the tank D. Thus, oil delivered to said manifold flows therefrom through the slot 24 into the tank D in the form of a wide, relatively thin sheet.

In the tank D is any desired number of substantially horizontally disposed, vertically spaced baffle plates 25 which extend from side to side and substantially from end to end of said tank. The uppermost of these baffle plates underlies the manifold 23 and extends from the end of the tank D nearer said manifold at a small downward inclination toward the other end of said tank from which it is suitably spaced as indicated at 26. The next lower baffle plate extends from the last mentioned end of the tank D at a small downward inclination toward the first mentioned end of said tank from which it is suitably spaced as indicated at 27. Only two of these baffle plates 25 are illustrated in the present instance, but more may be provided if desired. In any event, their relative arrangement is such as to reduce splashing or turbulence of oil in the tank D and to provide a zig-zag path for flow of the oil downwardly through said tank from end to end thereof. The oil flows in a broad, thin stream or band over said baffle plates and thereby any air contained therein is permitted readily to escape therefrom.

In the top portion of the tank D is a tray 28 which cooperates with the top wall of said tank to afford an air space 29 which is in communication with the spaces below the baffle plates 25 through open-ended tubes 30. Thus, any air released from oil flowing over said baffle plates, may enter the space 29 through said tubes 30. Moreover, small openings 31 preferably are provided in the baffle plates 25 adjacent to their first mentioned ends, and the tray 28 preferably is suitably perforated to provide additionally for free entry into the space 29 of any air released from the oil. The said space 29 is suitably vented as indicated at 32, for escape of air therefrom. Thus, when the oil flows through the tank D proper, it is deaerated and thereby better conditioned for use.

The by-pass flow-path defining means 17 includes a hopper 33 open and connected at its top with the tray 28 so that in the event of an accumulation of oil in said tray such oil may enter said hopper. However, to guard against overflow of oil from the upper end of said hopper into said tray, the said upper end of said hopper preferably is flared or enlarged and extends a limited distance upwardly into said tray, as indicted at 34.

In the bottom portion of the hopper 33 are ports 35 which afford communication between the bottom portion of said hopper and the bottom portion of the tank D under the control of suitable check valves 36, while located in the tank D near its bottom and connected to the hopper 33 is a substantially horizontally disposed plate 37 for conducting heat from oil flowing through said hopper to oil contained in the tank proper. The valves 36 open inwardly and close outwardly relative to the hopper 33 so that oil may not flow from said hopper into the tank D, but may flow only from said tank into said hopper.

The reservoir with which the present invention particularly is concerned is designated as 38 and, in accordance with the invention, is in the form of a cup disposed within the hopper 33 preferably coaxially therewith and in spaced relationship thereto. Its open top may be disposed at any suitable elevation relative to the hopper 33 and from its closed bottom portion, which likewise may be disposed at any suitable elevation relative to said hopper, a pipe 39, or a plurality of such pipes, may lead to a device, or to a plurality of devices, to be hydraulically operated, one such device 40 being conventionally illustrated in the present instance as for the purpose of feathering the blades of a propeller 41 driven by the engine A. In the pipe 39 is a suitable pump 42 for actuation at will to take oil from the reservoir 38 and to deliver it under pressure to the device 40 for operating the latter.

Extending from the second outlet opening 21 of the valve E downwardly into the reservoir 38 and terminating at its open lower end suitably above the closed bottom of said reservoir, is a tube 43 for delivery of oil from said valve opening 21 into said reservoir. This tube is spaced at its sides from the sides of said reservoir so that oil delivered to said reservoir may flow upwardly therethrough to overflow at its top into the hopper 33. At a suitable elevation above the top of said reservoir is suitably mounted a suitable deflector 44 to deflect oil from the top of said reservoir downwardly into the hopper 33. As is apparent, the reservoir 38 constitutes an oil trap in the by-pass path of flow defining means constituted by said reservoir, the hopper 31 and the tube 41 and thus insures a supply of oil for operating any desired device, such as the propeller feathering device 40, at any time desired.

The operation of a system such as illustrated is well understood and, briefly, is as follows: Under normal operating conditions the temperature of the oil is such as to actuate the valve E to direct all or most of the oil through the valve outlet opening 20 into the tank D proper where it is deaerated and from whence it flows to the return pipe 18 via the valve controlled ports 35 in the bottom portion of the hopper. If, however, the temperature of the oil should drop below a predetermined value the valve E will operate to direct the oil through the opening 21 and to the pipe 18 via the tube 43, the reservoir 38 and the hopper 33 in by-passing relationship to oil in the tank D. If atmospheric conditions are such as to cause the oil, if undiluted, to congeal when the engine A is idle, the valve 12 is opened at a suitable time prior to stopping of the engine A and thereby raw gasoline is admitted through the valve E to the lubricating system. The raw gasoline is cold and, consequently, causes the valve E to operate to deny communication between the pipe 16 and the outlet opening 20 and to establish communication between said pipe 16 and the outlet opening 21. Consequently, the oil in the tank D is by-passed and only the oil in the system exclusive of the oil in said tank D becomes diluted. When this oil becomes sufficiently diluted the valve 12 is closed to cut off the supply of diluting gasoline to the oil and the engine is stopped when the diluted oil has become distributed in the system. Thus, even though the atmospheric temperature may be so low as to congeal the undiluted oil in the tank D while the engine is idle, the diluted oil will permit ready starting of the engine whenever desired. Moreover, the reservoir 38 assures a supply of diluted oil for operating devices such as the feathering device 40 when the main body of the lubricating oil is congealed.

Upon starting and warm-up of the engine A, the diluted oil flowing through the by-pass flow-path 17 gradually heats the oil in the tank D until normal flow through the tank D proper is effected. Subsequent operation of the engine then results in vaporization of the diluting gasoline and its removal from the oil.

It is of special advantage to locate the reservoir 38 in the hopper 33 as thereby space is conserved, compactness of assembly is attained and there is avoided any possibility of congealing of oil in lines between the hopper 33 and said reservoir as might occur if said reservoir were located exteriorly of said hopper and connected thereto by lines.

From the foregoing description considered in connection with the accompanying drawings, it is believed that the invention will be clearly understood and its advantages appreciated. It is desired to point out, however, that while only a single specific structural embodiment of the invention has been illustrated and described, the same is readily susceptible of specifically different structural embodiments within its spirit and scope as defined in the appended claims.

I claim:

1. In an oil tank for lubricating systems, means in said tank defining a path for flow of oil therethrough in by-passing relationship to oil in the tank proper, valve means having an oil inlet and two oil outlets one communicating with the tank proper and the other with said means and operable by the temperature of the oil to direct the same either to the tank proper or to said means, means for outlet of oil from the tank proper and from said flow path defining means, means for introducing a diluent into the oil, and a reservoir for diluted oil in said flow path defining means communicating at its bottom with said other oil outlet and overflowing at its top into the flow path defining means thereby to be maintained filled with oil by oil flowing through said flow-path.

2. In an oil tank for lubricating systems, means in said tank defining a path for flow of oil therethrough in by-passing relationship to oil in the tank proper, valve means having an oil inlet and two oil outlets one communicating with the tank proper and the other with said means and operable by the temperature of the oil to direct the same either to the tank proper or to said means, means for outlet of oil from the tank proper and from said flow path defining means, means for introducing a diluent into the oil, a reservoir for diluted oil in said flow path defining means constructed and arranged to be maintained filled with reversely flowing oil by oil flowing through said flow-path, said reservoir being in the form of a cup disposed in receiving relationship to oil entering said flow path through the second mentioned outlet of said valve means, and a conduit extension from the said second mentioned outlet terminating adjacent the bottom of said cup.

3. In an oil tank for lubricating systems, means in said tank defining a path for flow of oil therethrough in by-passing relationship to oil in the tank proper, valve means having an oil inlet and two oil outlets one communicating with the tank proper and the other with said means and operable by the temperature of the oil to direct the same either to the tank proper or to said means, means for outlet of oil from the tank proper and from said flow path defining means, means for introducing a diluent into the oil, said flow-path defining means including a hopper, a reservoir in the form of a cup disposed in said hopper to have oil overflow therefrom into said hopper, a tube extending from the second mentioned outlet of said valve means into said cup and terminating adjacent the bottom thereof so that when oil is directed by said valve means through its second mentioned opening to said flow-path it maintains said cup filled with flowing oil for any desired use, and an outlet connection extending from said cup for the selective withdrawal of oil therefrom.

ELMER LANDIS.

REFERENCES CITED

The following references are of record in the file of this patent:

UNITED STATES PATENTS

| Number | Name | Date |
| --- | --- | --- |
| 2,312,495 | Soucek | Mar. 2, 1943 |
| 2,326,051 | Miller | Aug. 3, 1943 |
| 2,402,065 | Martin | June 11, 1946 |
| 2,408,266 | Miller | Sept. 24, 1946 |